United States Patent [19]
Greiff

[11] Patent Number: 5,126,812
[45] Date of Patent: Jun. 30, 1992

[54] MONOLITHIC MICROMECHANICAL ACCELEROMETER

[75] Inventor: Paul Greiff, Wayland, Mass.

[73] Assignee: The Charles Stark Draper Laboratory, Inc., Cambridge, Mass.

[21] Appl. No.: 528,051

[22] Filed: May 23, 1990

Related U.S. Application Data

[63] Continuation-in-part of Ser. No. 479,854, Feb. 14, 1990.

[51] Int. Cl.⁵ .................... H01L 29/66; H01L 29/96
[52] U.S. Cl. .................................... 357/25; 357/26
[58] Field of Search ........................ 357/25, 26, 55

[56] References Cited

U.S. PATENT DOCUMENTS

| | | | |
|---|---|---|---|
| 3,053,095 | 9/1962 | Koril et al. | 73/504 |
| 3,251,231 | 5/1966 | Hunt et al. | 73/505 |
| 3,370,458 | 2/1968 | Dillon | 73/141 |
| 3,913,035 | 10/1975 | Havens | 331/107 R |
| 4,044,305 | 8/1977 | Oberbeck | 324/154 R |
| 4,234,666 | 11/1980 | Gursky | 428/573 |
| 4,342,227 | 8/1982 | Petersen et al. | 73/510 |
| 4,381,672 | 5/1983 | O'Connor et al. | 73/505 |
| 4,406,992 | 9/1983 | Kurtz et al. | 338/2 |
| 4,411,741 | 10/1983 | Janata | 204/1 T |
| 4,468,584 | 9/1984 | Nakamura et al. | 310/370 |
| 4,478,076 | 10/1984 | Bohrer | 73/204 |
| 4,478,077 | 10/1984 | Bohrer et al. | 73/204 |
| 4,483,194 | 11/1984 | Rudolf | 73/517 R |
| 4,490,772 | 12/1984 | Blickstein | 361/281 |
| 4,495,499 | 1/1985 | Richardson | 343/5 DD |
| 4,499,778 | 2/1985 | Westhaver et al. | 74/5 F |
| 4,502,042 | 2/1985 | Wuhrl et al. | 340/568 |
| 4,522,072 | 6/1985 | Sulouff et al. | 73/765 |
| 4,524,619 | 6/1985 | Staudte | 73/505 |
| 4,538,461 | 9/1985 | Juptner et al. | 73/505 |

(List continued on next page.)

FOREIGN PATENT DOCUMENTS

| | | | |
|---|---|---|---|
| 59-158566 | 9/1984 | Japan | 357/25 |
| 61-144576 | 7/1986 | Japan | 357/25 |
| 62-71256 | 4/1987 | Japan | 357/25 |
| 62-221164 | 9/1987 | Japan | 357/25 |
| 63-169078 | 7/1988 | Japan | 357/25 |
| 2183040 | 5/1987 | United Kingdom | 357/25 |

OTHER PUBLICATIONS

Petersen et al., "Micromechanical Accelerometer..." Trans on ED, vol. ED-29, #1, Jan. 1982 pp. 23-27.

"A Vibratory Micromechanical Gyroscope", B. Boxenhorn et al, AIAA Guidance, Navigation and Control Conference, Aug. 15-17, 1988, pp. 1033-1040.

*Primary Examiner*—Andrew J. James
*Assistant Examiner*—Stephen D. Meier
*Attorney, Agent, or Firm*—Weingarten, Schurgin, Gagnebin & Hayes

[57] ABSTRACT

A micromechanical accelerometer is disclosed comprising a mass of monocrystalline silicon in which a substantially symmetrical plate attached to a silicon frame by flexible linkages is produced by selective etching. The plate has a plurality of apertures patterned and etched therethrough to speed further etching and freeing of the plate and flexible linkages, suspending them above a void etched beneath. The plate has a weight disposed thereon near an end remote from the flexible linkages. The plate is capable of limited motion about an axis created by the flexible linkages. Stop means limit motion of the plate about the axis. Strain relief tension beams are provided to relieve stress induced by boron diffusion necessary to provide etch stopping and the tension beams are trimmable in a manner which permits tuning of the resonant frequency of the plate. Grooves or depressions are provided in the flexible linkages to resist bending or buckling without increasing torsional stiffness. The plate and flexible linkages are electrically isolated from the silicon mass and frame by dielectric or P-N junction isolation. Integral P-N junction electrodes and surface bridging electrodes may be used to provide top to bottom symmetry in torquing and sensing of the plate while maintaining isolation and monlithic construction. Bias and readout circuitry used to sense and torque the plate may be provided integrally with the plate and formed during plate processing.

24 Claims, 6 Drawing Sheets

U.S. PATENT DOCUMENTS

| | | | |
|---|---|---|---|
| 4,585,083 | 4/1986 | Nishiguchi | 177/229 |
| 4,592,242 | 6/1986 | Kempas | 74/5 F |
| 4,596,158 | 6/1986 | Strugach | 74/5 F |
| 4,598,585 | 7/1986 | Boxenhorn | 73/505 |
| 4,600,934 | 7/1986 | Aine et al. | 357/26 |
| 4,619,001 | 10/1986 | Kane | 455/192 |
| 4,621,925 | 11/1986 | Masuda | 356/350 |
| 4,628,283 | 12/1986 | Reynolds | 331/68 |
| 4,629,957 | 12/1986 | Walters et al. | 318/662 |
| 4,639,690 | 1/1987 | Lewis | 331/96 |
| 4,644,753 | 2/1987 | Church | 73/505 |
| 4,651,564 | 3/1987 | Johnson et al. | 73/204 |
| 4,653,326 | 3/1987 | Danel et al. | 73/517 R |
| 4,654,663 | 3/1987 | Alsenz et al. | 340/870.3 |
| 4,665,605 | 5/1987 | Kempas | 29/434 |
| 4,670,092 | 6/1987 | Motamedi | 156/643 |
| 4,671,112 | 6/1987 | Kimura et al. | 73/505 |
| 4,674,180 | 6/1987 | Zavracky et al. | 29/622 |
| 4,674,319 | 6/1987 | Muller et al. | 73/23 |
| 4,679,434 | 7/1987 | Stewart | 73/517 B |
| 4,680,606 | 7/1987 | Knutti et al. | 351/26 |
| 4,699,006 | 10/1987 | Boxenhorn | 73/517 |
| 4,705,659 | 11/1987 | Bernstein et al. | 264/29.6 |
| 4,706,374 | 11/1987 | Murakami | 437/225 |
| 4,712,439 | 12/1987 | North | 74/84 R |
| 4,736,629 | 4/1988 | Cole | 73/517 R |
| 4,743,789 | 5/1988 | Puskas | 310/316 |
| 4,744,248 | 5/1988 | Stewaart | 73/505 |
| 4,744,249 | 5/1988 | Stewart | 73/505 |
| 4,747,312 | 5/1988 | Herzl | 73/861.38 |
| 4,750,364 | 6/1988 | Kawamura et al. | 73/510 |
| 4,764,244 | 8/1988 | Chitty et al. | 156/630 |
| 4,776,924 | 10/1988 | Delapierre | 156/647 |
| 4,783,237 | 11/1988 | Aine et al. | 437/15 |
| 4,789,803 | 12/1988 | Jacobsen et al. | 310/309 |
| 4,792,676 | 12/1988 | Hojo et al. | 250/231 GY |
| 4,805,456 | 2/1989 | Howe et al. | 73/517 |
| 4,808,948 | 2/1989 | Patel et al. | 331/4 |
| 4,851,080 | 7/1989 | Howe et al. | 156/647 |
| 4,855,544 | 8/1989 | Glenn | 200/61.45 R |
| 4,869,107 | 9/1989 | Murakami | 73/517 R |
| 4,882,933 | 11/1989 | Petersen et al. | 73/517 R |
| 4,884,446 | 12/1989 | Ljung | 73/505 |
| 4,890,812 | 1/1990 | Chechile et al. | 248/674 |
| 4,893,509 | 1/1990 | MacIver et al. | 73/517 |
| 4,899,587 | 2/1990 | Staudte | 73/505 |
| 4,901,586 | 2/1990 | Blake et al. | 73/862.59 |
| 4,916,520 | 4/1990 | Kurashima | 357/71 |
| 5,016,072 | 5/1991 | Greiff | 357/26 |

OTHER PUBLICATIONS

"*Monolithic Silicon Accelerometer*", B. Boxenhorn et al, Tranducers '89, Jun. 25,30, 1989, pp. 273–277.

"*An Electrostatically Rebalanced Micromechanical Accelerometer*", B. Boxenhorn et al, AIAA Guidance, Navigation and Control Conference, Aug. 14–16, 1989, pp. 118–122.

"*The Micromechanical Inertial Guidance System and its Application*", B. Boxenhorn et al, Fourteenth Biennial Guidance Test Symposium, Oct. 3–5, 1989, pp. 113–131.

"*Tensometric Accelerometers With Overload Protection*", L. Moskalik, Meas. Tech. (USA), vol. 22, No. 12, 1979 (Publ. May 1980), pp. 1469–1471.

"*Silicon as a Mechanical Material*", Peterson et al, Proceedings of the IEEE, vol. 70, No. 5, May 1982, pp. 420–457.

"*Quartz Rate Sensor Replaces Gyros*", Defense Electronics, Nov. 1984, p. 177.

"*A Monolithic Silicon Accelerometer With Integral Air Damping And Overrange Protection*", Barth et al, IEEE, 1988, pp. 35–38.

"*Machining In the Micro Domain*", Jerome Rosen, Mechanical Engineering, Mar. 1989, pp. 49–46.

M. Nakamura et al., "Novel Electromechanical Micro-Machining and Its Application for Semiconductor Acceleration Sensor IC," *Digest of Technical Papers* (1987), Institute of Electrical Engineers of Japan, pp. 112–115.

MONOLITHIC MICROMECHANICAL ACCELEROMETER

CROSS REFERENCE TO RELATED APPLICATIONS

The present application is a continuation-in-Part of co-pending commonly assigned U.S. application Ser. No. 07/479,854, filed Feb. 14, 1990 entitled METHOD AND APPARATUS FOR SEMICONDUCTOR CHIP TRANSDUCER.

FIELD AND BACKGROUND OF THE INVENTION

The present invention relates to accelerometers, in particular to micromechanical accelerometers.

Semiconductor materials such as mono and polycrystalline silicon, and semiconductor mass production fabrication techniques have been used to produce micromechanical accelerometers, as in U.S. Pat. No. 4,483,194. More sophisticated devices employ more advanced technology to yield monolithic micromechanical accelerometers, as in U.S. Pat. Nos. 4,805,456 and 4,851,080.

Advances in micromechanical transducer technology are described in Applicant's co-pending, commonly assigned U.S. patent application Ser. No. 07/372,653 entitled BRIDGE ELECTRODES; U.S. patent application Ser. No. 07/373,032 entitled RESTRAINTS FOR MICROMECHANICAL DEVICES; U.S. patent Application Serial No. 07/560,374 entitled MOTION RESTRAINTS FOR MICROMECHANICAL DEVICES; U.S. patent application Ser. No. 07/470,938 entitled MICROMECHANICAL DEVICE WITH A TRIMMABLE RESONANT FREQUENCY STRUCTURE AND METHOD OF TRIMMING SAME; and U.S. patent application Ser. No. 07/493,327 entitled SEMICONDUCTOR CHIP GYROSCOPIC TRANSDUCER, all of which are incorporated herein by reference.

The present invention is concerned with application of such advances specifically to accelerometers and further advancement of monolithic micromechanical accelerometers.

SUMMARY OF THE INVENTION

A micromechanical accelerometer is disclosed comprising a mass of monocrystalline silicon in which a substantially symmetrical plate attached to a silicon frame by flexible linkages is produced by selective etching. The plate has a plurality of apertures patterned and etched therethrough to speed further etching and freeing of the plate and flexible linkages, suspending them above a void etched beneath. The plate has a weight disposed thereon near an end remote from the flexible linkages. The plate is capable of limited motion about an axis created by the flexible linkages. Stop means limit motion of the plate about the axis. Strain relief tension beams are provided to relieve stress induced by boron diffusion necessary to provide etch stopping and the tension beams are trimmable in a manner which permits tuning of the resonant frequency of the plate. Grooves or depressions are provided in the flexible linkages to resist bending or buckling without increasing torsional stiffness. The plate and flexible linkages are electrically isolated from the silicon mass and frame by dielectric or P-N junction isolation. Integral P-N junction electrodes and surface bridging electrodes may be used to provide top to bottom symmetry in torquing and sensing of the plate while maintaining isolation and monolithic construction. Bias and readout circuitry used to sense and torque the plate may be provided integrally with the plate and formed during plate processing.

DESCRIPTION OF THE DRAWING

The invention will be more fully understood from the following detailed description of an illustrative embodiment taken in conjunction with the accompanying drawing in which.

DETAILED DESCRIPTION OF THE INVENTION

Figure 1:
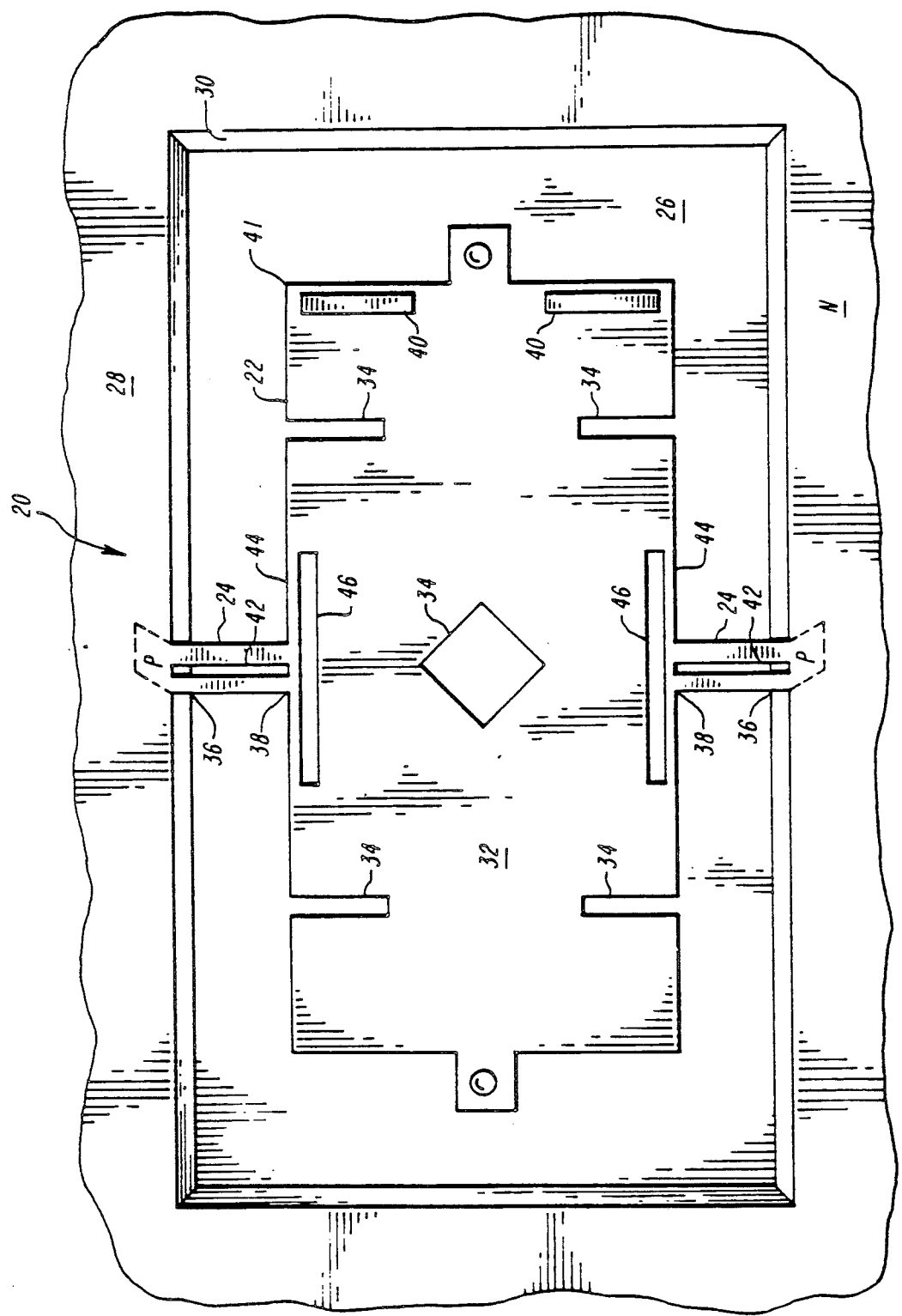
FIG. 1 is a top view of a micromechanical accelerometer according to the invention.
Figure 2:
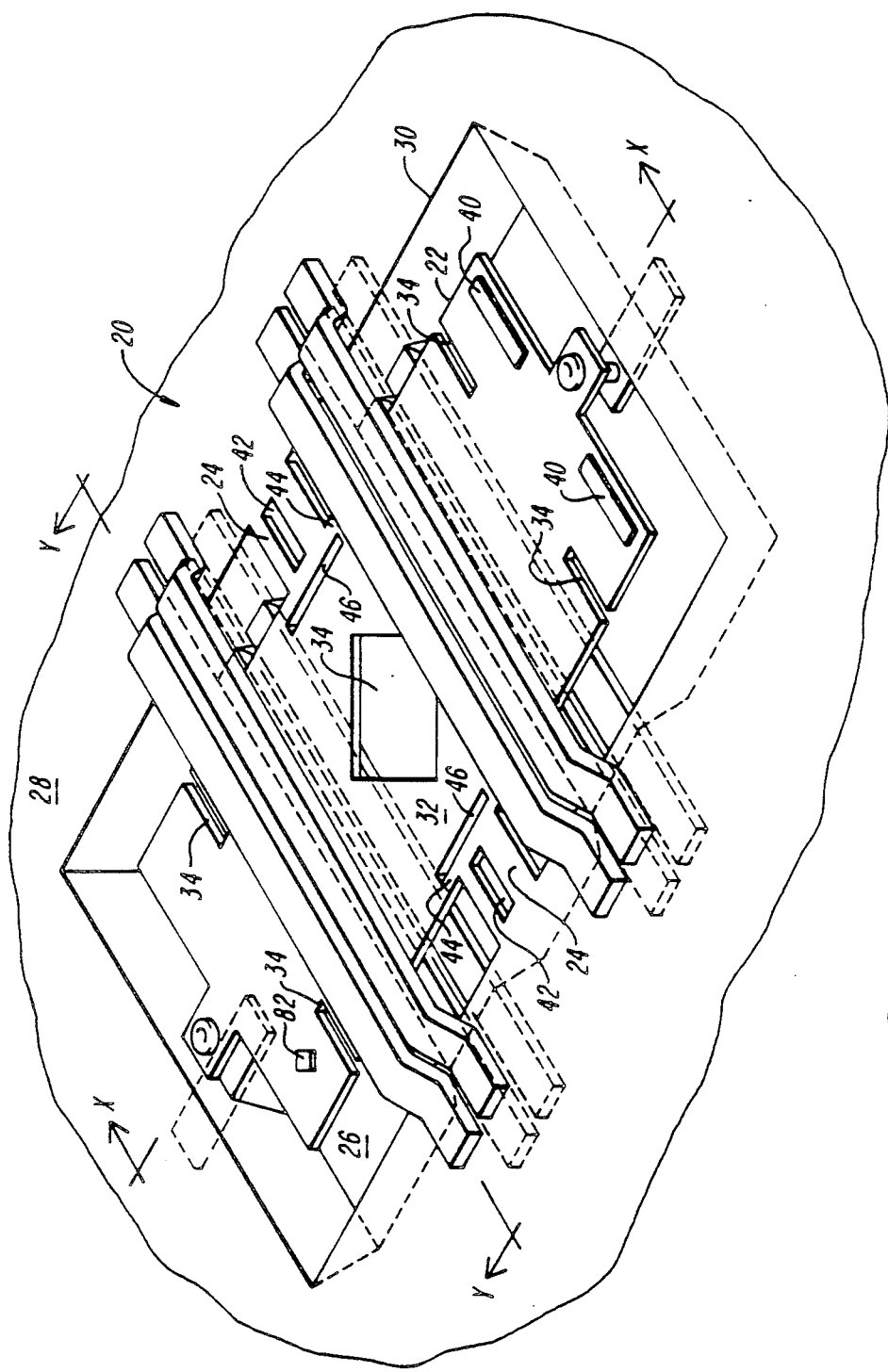
FIG. 2 is a perspective view of a micromechanical accelerometer according to the invention.

Referring to FIGS. 1 and 2, a micromechanical accelerometer 20 comprises a transducer element 22 which is suspended by a pair of flexible linkages 24 above a void 26 in a mass of silicon 28. The silicon mass 28 is preferably an N-type epitaxially grown layer on a base of monocrystalline N-type silicon. Selective doping and etching yields P type transducer element 22 and flexible linkages 24 freely suspended in a frame 30 above void 26.

Processes for selective doping and etching of silicon mass 28 are described in the above-referenced applications.

Transducer element 22 includes a substantially symmetrical plate 32, torsionally supported by linkages 24, doped P-type and selectively etched free from silicon mass 28. A plurality of etch facilitating slots 34 are formed through plate 32 to speed up and assure complete undercutting of plate 32 during formation of void 26 and release of element 22 from silicon mass 28. The pair of flexible linkages 24 have first ends 36 connected to silicon frame 30 and second ends 38 connected to plate 32. The plate 32 is completely detached from silicon mass 28 and free to rotate about an axis formed by the flexible linkages 24. If the flexible linkages 24 are created by selectively P-type doping areas defining the linkages 24 and plate 32, the resulting transducer element 22 is effectively isolated by the P-N junction between P-type plate and N-type frame 30 created by doping the flexure and plate areas.

Alternatively, dielectric isolation of transducer element 22 can be achieved by growing an oxide or silicon nitride layer or combination thereof or the like over the N-type mass 28, as described in the referenced applications, to form flexible linkages thereon. Dielectric isolation will provide much lower capacitance between the plate 32, flexible linkages 24 and the remainder of mass 28 permitting a device having a significantly greater signal-to-noise ratio than a similar device having P-N junction isolation of plate and flexures.

Plate 32 is substantially rectangular, being a typical size 300×600 microns, and has a proof mass or weight 40 disposed near an end 41. Weight 40 is a two-piece asymmetric mass, being disposed at only one end of plate 32 remote from linkages 24. The weight 40 is provided by plating or otherwise depositing a surface metallization near end 41 of plate 32. Preferably, weight 40 is located beyond electrodes, discussed hereinafter, to minimize the effects of temperature, which can cause the metallized end to bow and introduce inaccuracies into the device. The metallization is done when other structures of the accelerometer are metallized. Weight 40 provides sensitivity to acceleration forces perpendicular to the plate 32.

Figure 3B:
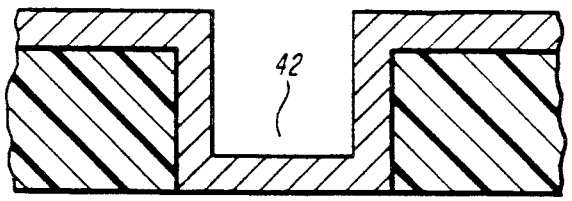
FIG. 3B is a cross-section of flexible linkage grooves formed by plasma etching.
Figure 3A:
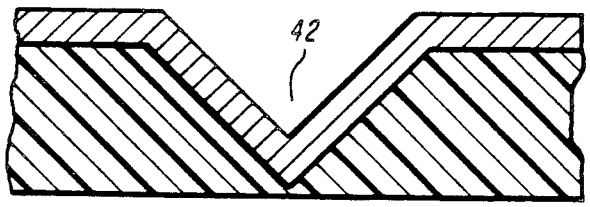
FIG. 3A is a cross-section of flexible linkage grooves formed by anisotropic etching.

Flexible linkages 24 attach plate 32 to frame 30 of silicon mass 28. The linkages 24 are provided with depressions or grooves 42 which give the linkages added strength against buckling or bending while maintaining desired torsional flexibility. Depressions or grooves 42 may be etched into linkages 24 anisotropically, in which case they have a "v" cross-section, as illustrated in FIG. 3A. Alternatively, the depressions for grooves 42 may be formed in linkages 42 by other processes known in the art, such as plasma etching which provides a U-beam configuration as illustrated in FIG. 3B. After forming the depressions for grooves 42, a shallow selective P-type diffusion defining flexible linkages 24 also diffuses into the depressions and creates the "V" or "U" structure that survives the final etch.

Each of the flexible linkages 24 has a tension relief beam 44, located proximate to its second end, formed by allowing etching of a slot 46 through plate 32 during the final etch to free plate 32. The beams 44 relieve tension created by boron doping of the linkages 24 and plate 32. Boron doping results in the etch resistance of structural elements, however, it also reduces lattice spacing of the doped P-type structures with respect to the surrounding N-type silicon mass 28. The P-type structure tries to shrink when undercut, but is restrained by thicker mass 28, putting the flexible linkages 24 in tension. The lattice spacing reduction coupled with a boron concentration gradient also results in a slight bow in plate 32, which can be compensated for by means discussed hereinafter. Tension in the flexure or flexible linkages, is relieved by etching slots 46 through the plate 32. As opposed to unrelieved linkages, the tension relief provided by beams 44 results in linkages which are less stiff, enhancing the sensitivity of the device. The beams 44 created by slots 46 are trimmable in a manner which permits tuning of the resonant frequency of plate 32. Trimming of beams 44, such as by laser ablation of plate 32 to elongate slot 46, is described in the above-referenced application.

Figure 4A:
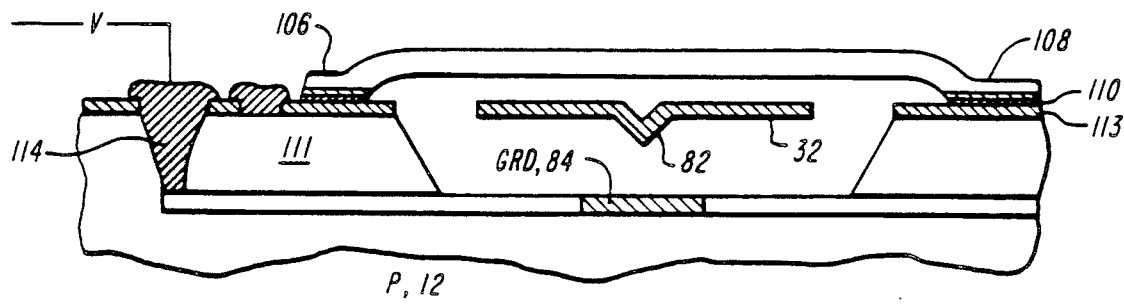
FIG. 4A is an expanded cross-section of the micromechanical accelerometer of FIG. 2 taken along a line Y—Y and showing a protuberant motion restraint or dimple.

To facilitate sensing of acceleration-induced rotation and re-balance torquing of plate 32, a plurality of electrodes are provided in the micromechanical accelerometer according to the invention. Symmetrical torquing and sensing of plate 32 is preferable and is provided by having paired upper and lower torquing and sensing electrodes as shown in FIG. 4. Four buried electrodes 48, 50, 52 and 54 are fabricated as doped P-type regions on the surface of an underlying N-type mass 49 on which the N-type silicon mass 28 is grown. The P-type integral electrodes 48, 50, 52 and 54 are positioned to lie beneath plate 32. Four bridge electrodes, 56, 58, 60 and 62 span transducer element 22 as photolithographically produced metalizations over resist layers above plate 32, as illustrated in FIG. 4A, in paired alignment with buried electrodes 48, 50, 52 and 54, respectively.

Figure 4B:
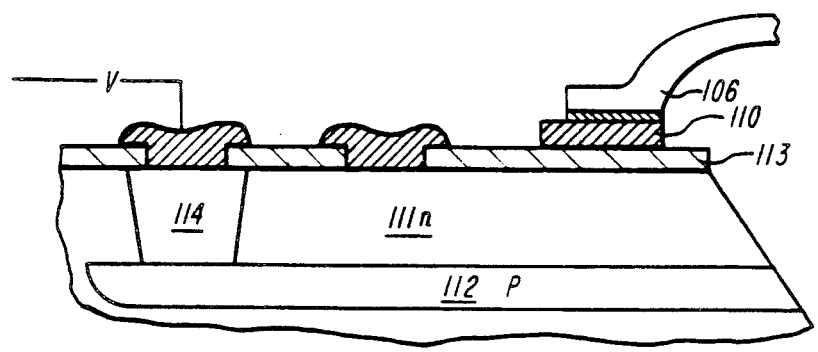
FIG. 4B is an expanded cross-section of an electrically isolated bridge electrode landing.
Figure 4:
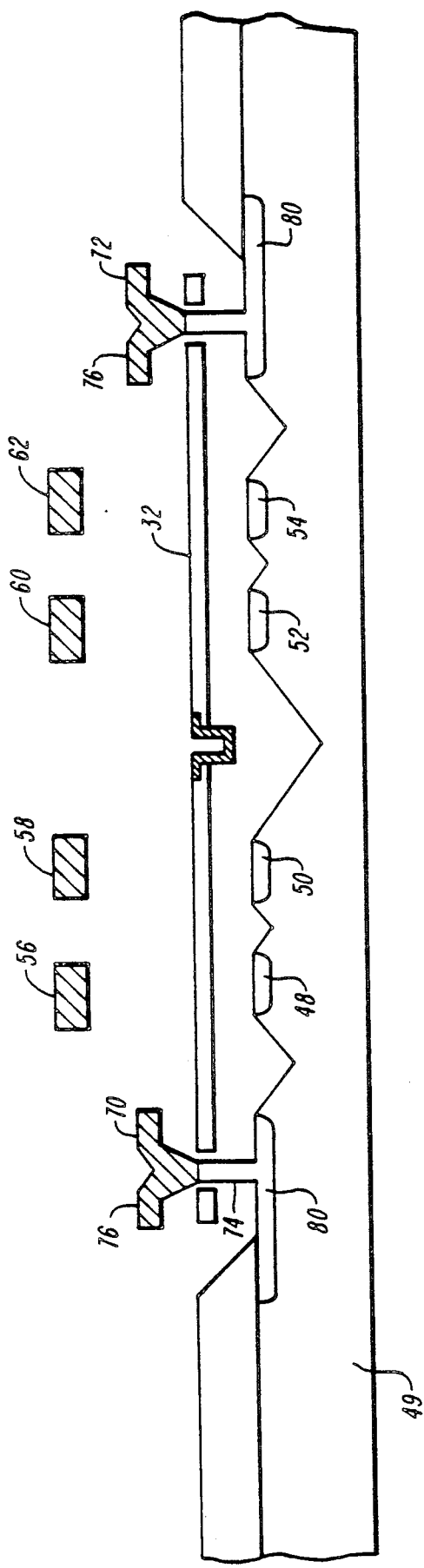
FIG. 4 is a cross-section view of the micromechanical accelerometer of FIG. 2 taken along a line X—X and showing a toadstool motion restraint.
Figure 5A:
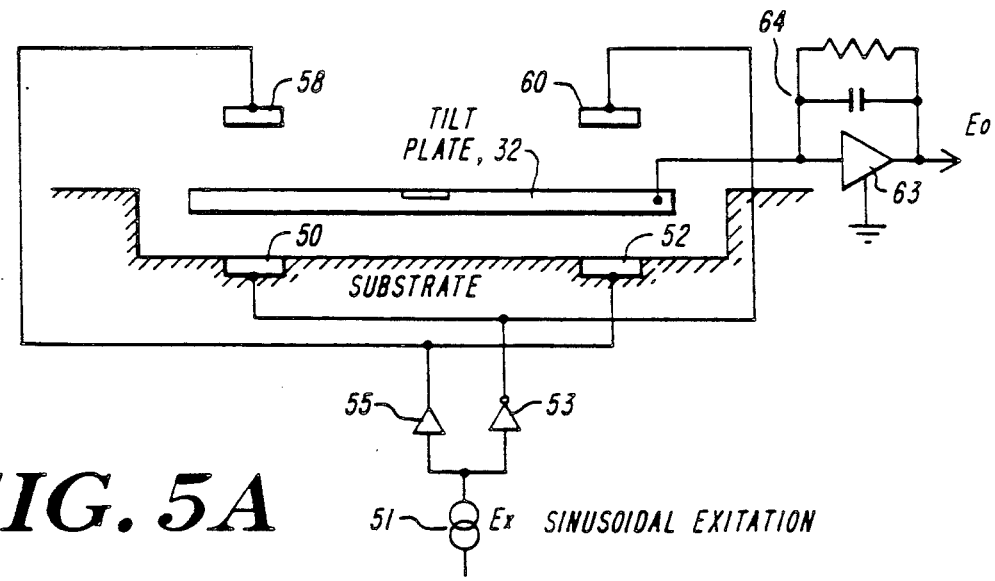
FIG. 5A is a diagrammatic representation of a sensor electrode configuration of a micromechanical accelerometer according to the invention.
Figure 5B:
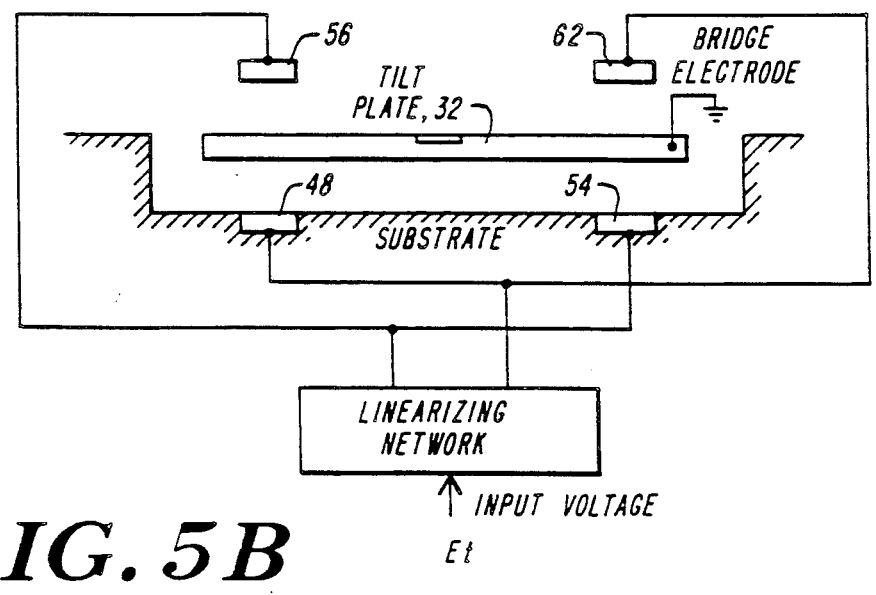
FIG. 5B is a diagrammatic representation of a torquer electrode configuration of a micromechanical accelerometer according to the invention.

As illustrated in FIGS. 4, 5A and 5B, an inner pair of integral electrodes 50, 52 and an inner pair of bridge electrodes 58, 60 are used as sense electrodes, while an outer pair of integral electrodes 48, 54 and an outer pair of bridge electrodes 56, 62 are used as torque electrodes.

Differential capacitance change, resulting from positional tilt of the plate 32 due to accelerations, is sensed by both pairs of sense electrodes 50, 52, 58 and 60. Each pair of sense electrodes is electrically driven 180° out-of-phase with respect to the other pair with a 100 kHz frequency signal so that a net current out of the plate is obtained when the plate 32 tilts. The magnitude and phase of the current from plate 32 is amplified and gives a measure of the angular position of the plate 32 For this purpose electrodes 50 and 60 are driven from a source 51 through inverting amplifier 53 while electrodes 52 and 58 are driven through non inverting amplifier 55. Plate 32 is connected to an amplifier 63 having a feedback network 64. When the plate 32 is centered (i.e., not tilted by acceleration), capacitances between the plate 32 and electrodes 50, 52, 58 and 60 are equal and there is no net current at the summing junction of amplifier 63, connected to the plate 32 and thus no output voltage. When plate 32 tilts, as a result of acceleration, the capacitances between the plate 32 and electrodes 50, 52, 58 and 60 are unbalanced. A net current is present at the summing junction of amplifier 63 resulting in an AC voltage output proportional to the change in differential capacitance and thus tilt. Feedback network 64 allows the input of amplifier 63 to operate at a virtual ground. Amplifier 63 and feedback network 64 are preferably fabricated on the instrument chip. This configuration provides minimum capacitive loading on the output node, reduces parasitic capacitance and noise pickup and, therefore, results in a higher output signal-to-noise ratio. Access to the amplifier 63 is via a metalization to a reverse biased P-type flexible linkage 24.

Referring now to FIG. 5B, since the accelerometer is to be operated closed loop, positional information is fed to a control loop which generates a voltage proportional to tilt angle. Another set of electrodes, outer pair of buried electrodes 48, 54 and outer bridge electrodes 56, 62 are used to apply a linearized analog of this voltage, differentially to the plate 32, electrostatically torquing the plate to restrain it against tilt.

A configuration of an accelerometer according to the invention may be implemented using only buried or integral electrodes without opposing bridge electrodes. Such an embodiment is illustrated in an electrical circuit model shown in FIG. 6.

Since the force on a capacitor is proportional to the square of the applied voltage, it is desirable to linearize the net torque as a function of the output voltage proportional to tilt angle before torquing the plate 32 by applying voltage to buried torque electrodes.

Linearization is done by using the following relationships:

$$\text{net torque: } T = k[V1^2 - V2^2]$$

where V1 is the voltage applied to one torque electrode (or set of electrodes acting in the same direction), V2 is the voltage applied to the other electrode, and k is a constant depending on the geometry, the dielectric constant, and the gap between the tilt plate and the torque electrode. Let:

$$V1 = B + E_t$$

$$V2 = B - E_t.$$

where B is a fixed bias that holds the plate centered in the absence of acceleration. Then combining these three, $$\begin{aligned} T &= k[(B + E_t)^2 - (B - E_t)^2] \\ &= k[(B^2 + 2E_tB + E_t^2) - (B^2 - 2BE_t + E_t^2)] \\ &= k4BE_t \end{aligned}$$

Figure 6:
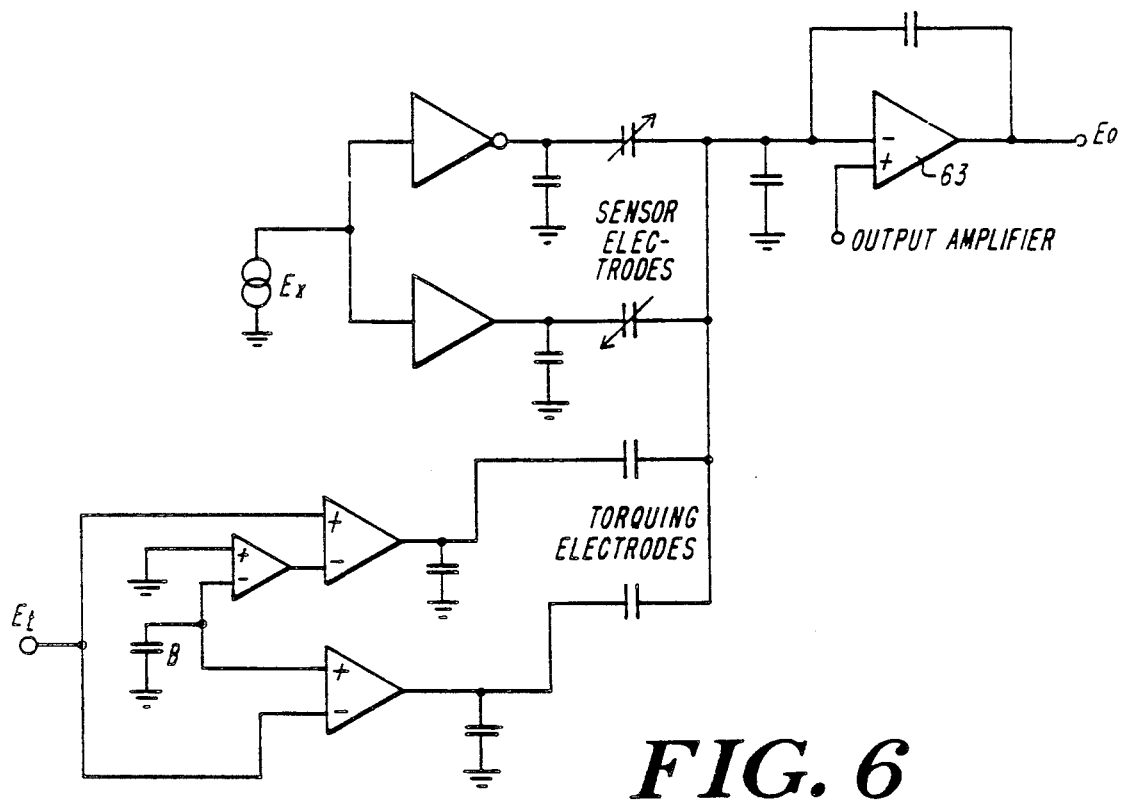
FIG. 6 is a circuit diagram for a torque system for use without opposing electrodes.

The torquing circuit shown in FIG. 6 implements the above algorithm, resulting in a linear relationship between the applied voltage $E_t$ and net torque T applied to the tilt plate. The bias voltage also serves to bias the P-N junction of the integral electrodes appropriately.

Figure 7:
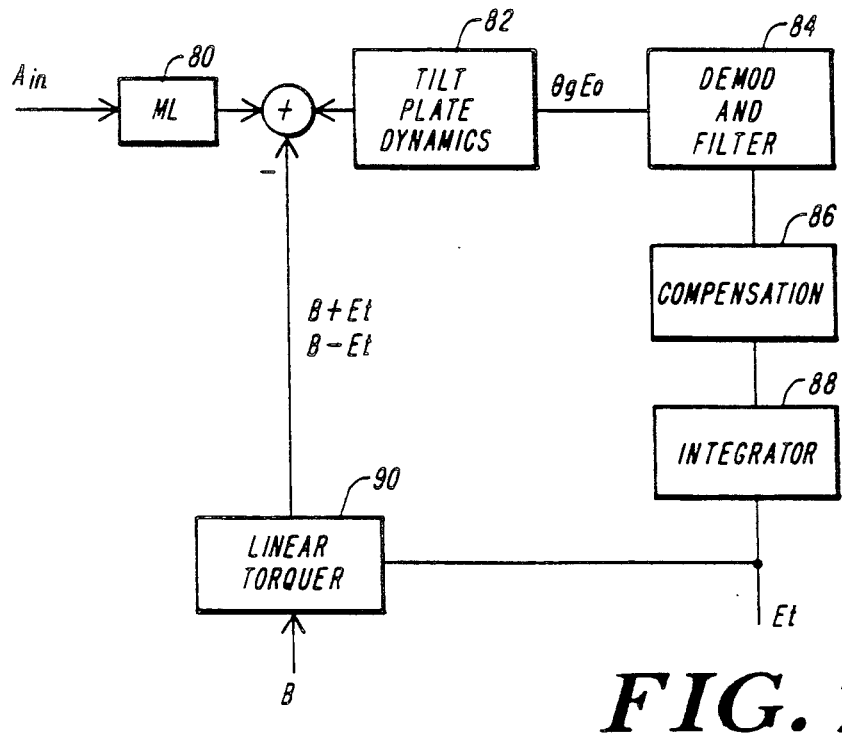
FIG. 7 is a diagrammatic representation of accelerometer electronics having a feedback loop for rebalance.

The circuit configuration of FIG. 6 is used in a feedback loop to rebalance the tilt plate. A functional block diagram of the loop is shown in FIG. 7. An acceleration Ain impressed on the instrument results in a torque applied to the transducer which is a function of a plate pendulous mass and a pendulum length, represented as 80 in FIG. 7. Tilt angle of the plate is measured as a differential capacitance as discussed hereinbefore, by what is functionally an angle sensor 82. The output $E_o$ of the angle sensor 82, is demodulated 84 with respect to the 100 kHz excitation signal of the sensor. The DC output of the demodulator is then passed through servo compensation 86 to an integrator 88. The output of the integrator 88 is fed back to the torque network 90 previously described, which serves to drive the tilt plate back so as to zero the output angle $\theta$. Any acceleration, Ain, will apply a torque to the tilt plate equal to Ain*M*L, where M is the pendulous mass and L the pendulum length. The loop then serves to rebalance the tilt plate, resulting in a voltage on the integrator output $E_t$. This voltage, required to hold the plate against the acceleration torque is the instrument output in volts, and is proportional to the input acceleration for a perfectly linear torquer.

It is advantageous to have integral and bridge electrodes opposed on the top and bottom of plate 32. With either sense or torque electrodes on only one side of the plate there is a net force between the plate 32 and the substrate 28 which tends to pull the plate toward the substrate. By using two pair of opposing electrodes, one pair on each side of the tilt plate, the electrodes can be connected as indicated in FIGS. 5A and 5B to cancel out this force. Furthermore, because of the differential nature of such a configuration the output of the sense electrodes and the torque applied by torque electrodes, as functions of the angle of plate 32, will be linearized.

Figure 4C:
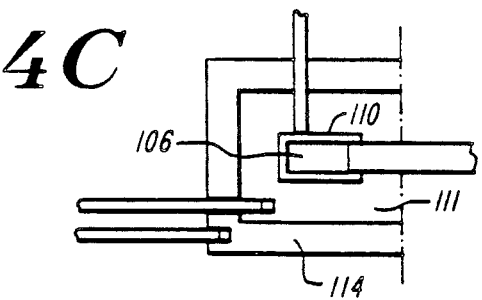
FIG. 4C is a top view of the bridge electrode landing of FIG. 4B having surface metalizations to effect a driven shield.

It may be desirable to further enhance the integrity of signals derived using bridge electrodes, as illustrated in FIGS. 4–4C and effecting driven shields thereunder. Each bridge electrode has opposite landings or terminations represented by landings 106,108 illustrated in FIGS. 4A, 4B and 4C, disposed on the silicon frame. The electrode landings are formed over a metallization layer 110. An oxide layer 113 provides DC electrical isolation but capacitance to substrate is still large. In some cases (i.e., where the bridge electrodes are used at high impedance for signal pickoff instead of excitation from a low impedance source) this capacitance adversely affects the signal.

The construction illustrated in FIGS. 4A, 4B and 4C provides a driven shield to effectively neutralize this capacitance. As shown in FIG. 4C, electrical isolation region 111 is provided under the landing of the signal pickoff bridge. In the discussion to follow it is understood that both regions 111, on both sides of the bridge, are treated the same electrically. Region 111 is DC-isolated by the surrounding P regions 112, 114, which effect an isolating floor and wall, respectively. Region 111 is driven at the same (or nearly the same) potential as electrode landing 106 and the capacitance between them is thus electrically neutralized, maximizing the signal-to-noise ratio at the point of pickoff.

The extent of rotation of plate 32 about the axis formed by flexures 24 ma be limited by the implementation of mechanical stops, the function and fabrication of which is discussed in detail in the referenced application entitled MOTION RESTRAINTS FOR MICROMECHANICAL DEVICES. Such mechanical stops are illustrated in FIG. 4 which shows a side sectional view of an accelerometer according to the invention including "toadstool"-shaped stops 70, 72.

Stops 70,72, each have a post 74 and cap 76 disposed thereon. The posts 74 are disposed within circular apertures 78 in plate 32 (best viewed in FIG. 1). Posts 74 must be fabricated of such dimensions such that plate 32 moves freely with respect thereto and so as to account for any bowing of plate 32 due to crystal lattice spacing reduction resulting from boron doping. The bottoms of posts 74 are each anchored to buried or cantilevered electrodes which are maintained at the same potential as plate 32.

Alternatively, as shown in FIG. 4A, a micromechanical accelerometer according to the invention may include dimples 82 disposed at the extreme ends of plate 32 to effect mechanical motion restraint. Such dimples 82 would be disposed protruding from beneath plate 32, above a grounded buried or cantilevered electrode 84. Like the toadstool stops, dimples must be fabricated of such a dimension so as to account for bowing of plate 32 while effecting motion restraint and should be applied symmetrically relative to the plate.

Although asymmetry of the tilt plate is shown hereinbefore as resulting from a plated mass disposed thereon, it should be appreciated that such asymmetry may be obtained by extending one end of the plate 32.

Although, in the embodiments discussed herein, the inner electrodes performed sensing and outer electrodes performed torquing, one of ordinary skill in the art may appreciate that these functions could be interchanged so that outer electrodes sensed while inner electrodes provided torque.

Although toadstool stops and dimples are discussed as motion restraints in embodiments of an accelerometer according to the invention, other motion restraining techniques may be implemented, such as cantilevered stops.

Although the invention has been shown and described with respect to an illustrative embodiment thereof, it should be understood by those skilled in the art that these and various other changes, omissions and additions in the form and detail thereof may be made therein without departing from the spirit and scope of the invention as defined in the following claims.

What is claimed is:

1. A monolithic micromechanical accelerometer that includes a semiconductor transducer element, comprising:
   a mass of semiconductor material having a void on a top surface extending downwards, said mass of semiconductor material comprising a silicon frame;
   a plurality of flexible linkages integral with said frame for coupling said transducer element to said frame at opposite sides, said plurality of flexible linkages having first and second ends, said first ends being connected to said silicon frame;
   a plurality of electrodes disposed proximate to said void;
   a plate connected integrally to and substantially symmetrical with respect to said second ends of said plurality of flexible linkages, said plate having a plurality of apertures therethrough and having a portion facing said plurality of electrodes; and
   a weight disposed asymmetrically on said plate and proximate to an end of said plate.

2. A monolithic micromechanical accelerometer that includes a semiconductor transducer element, comprising:
   a mass of semiconductor material having a void on a top surface extending downwards, said mass of semiconductor material comprising a silicon frame;
   a plurality of flexible linkages integral with said frame for coupling said transducer element to said frame at opposite sides, said plurality of flexible linkages having first and second ends, said first ends being connected to said silicon frame;
   at least one groove disposed in each of said plurality of flexible linkages said at least one groove substantially precluding bending and buckling of respective ones of said plurality of flexible linkages;
   a plurality of electrodes disposed proximate to said void;
   a plate connected integrally to and substantially symmetrical with respect to said second ends of said plurality of flexible linkages, said plate having a plurality of apertures therethrough and having a portion facing said plurality of electrodes; and
   a weight disposed asymmetrically on said plate and proximate to an end of said plate.

3. A monolithic micromechanical accelerometer that includes a semiconductor transducer element, comprising:
   a mass of semiconductor material having a void on a top surface extending downwards, said mass of semiconductor material comprising a silicon frame;
   a plurality of flexible linkages integral with said frame for coupling said transducer element to said frame at opposite sides, said plurality of flexible linkages having first and second ends, said first ends being connected to said silicon frame;
   a plurality of electrodes disposed proximate to said void;
   a plate connected integrally to and substantially symmetrical with respect to said second ends of said plurality of flexible linkages, said plate having a plurality of apertures therethrough and having a portion facing said plurality of electrodes;
   relief means, disposed on said plate proximate to said plurality of flexible linkages for relieving stresses on said plate created by doping of said transducer element; and
   a weight disposed asymmetrically on said plate and proximate to an end of said plate.

4. A monolithic micromechanical accelerometer that includes a semiconductor transducer element, comprising:
   a mass of semiconductor material having a void on a top surface extending downwards, said mass of semiconductor material comprising a silicon frame;
   a plurality of flexible linkages integral with said frame for coupling said transducer element to said frame at opposite sides, said plurality of flexible linkages having first and second ends, said first ends being connected to said silicon frame;
   at least one groove disposed in each of said plurality of flexible linkages said at least one groove substantially precluding bending and buckling of respective ones of said plurality of flexible linkages;
   a plurality of electrodes disposed proximate to said void;
   a plate connected integrally to and substantially symmetrical with respect to said second ends of said plurality of flexible linkages, said plate having a plurality of apertures therethrough and having a portion facing said plurality of electrodes;
   relief means, disposed on said plate proximate to said plurality of flexible linkages for relieving stresses on said plate created by doping of said transducer element; and
   a weight disposed asymmetrically on said plate and proximate to an end of said plate.

5. The micromechanical accelerometer of claim 1, 2, 3 or 4 wherein at least one of said plurality of electrodes is integral to said mass of silicon and facing a bottom side of said plate.

6. The micromechanical accelerometer of claim 5 wherein said at least one of said plurality of electrodes is formed integrally as a highly doped P-type region patterned on an N-type silicon sub-surface.

7. The micromechanical accelerometer of claim 1, 2, 3 or 4 wherein at least one of said plurality of electrodes is a surface bridging electrode traversing said transducer element.

8. The micromechanical accelerometer of claim 7 wherein said surface bridging electrodes are supported above said frame on a region of doped material.

9. The micromechanical accelerometer of claim 8 wherein said doped region of material further comprises an isolating wall and an isolating floor doped with one of a P-type and an N-type dopant and an isolating intermediate area doped with the other of said P-type and N-type dopant and wherein each of said plurality of bridging electrodes is electrically isolated by biasing said doped region relative to said mass to effect a driven shield comprising said isolating wall, said isolating floor and said isolating intermediate area.

10. The micromechanical accelerometer of claim 1, 2, 3 or 4 further comprising isolation means for electrically isolating said transducer element from said silicon frame.

11. The micromechanical accelerometer of claim 10 wherein said isolation means is provided by a dielectric layer.

12. The micromechanical accelerometer of claim 11 wherein said isolation means is provided by a layer of oxide.

13. The micromechanical accelerometer of claim 11 wherein said isolation means is provided by a layer of silicon nitride.

14. The micromechanical accelerometer of claim 10 wherein said isolation means is provided by a combination of oxide and silicon nitride.

15. The micromechanical accelerometer of claim 10 wherein said isolation means is provided by doping said flexible linkages P-type and maintaining said silicon frame N-type effecting a P-N junction where said flexible linkages and said frame meet.

16. The micromechanical accelerometer of claim 1, 2, 3 or 4 further comprising stop means for limiting the extend of rotation of said plate about an axis formed by said first and second ends of said flexible linkages.

17. The micromechanical accelerometer of claim 16 wherein said stop means has a stem extending through an aperture in said plate and a cap disposed above said plate whereby said plate is free to move about said stem and is limited it its movement by said cap.

18. The micromechanical accelerometer of claim 16 wherein said stop means is a cantilever beam extending outward from said frame above said transducer element.

19. The micromechanical accelerometer of claim 16 wherein said stop means is a protuberant member extending beneath said plate in proximity to an end thereof.

20. The micromechanical accelerometer of claim 16 wherein a surface opposite said stop means comprises a material resistant to sticking.

21. The micromechanical accelerometer of claim 2 or 4 wherein said at least one groove has a substantially V-shaped cross-section which is formed in each of said plurality of flexible linkages by anisotropic etching.

22. The micromechanical accelerometer of claim 2 or 4 wherein said at least one groove has a substantially U-shaped cross-section which is formed in each of said plurality of flexible linkages by plasma etching.

23. The micromechanical accelerometer of claim 3 or 4 wherein said relief means comprises a beam formed by a slot disposed in said plate in proximity to second ends of each of said plurality of flexible linkages.

24. The micromechanical accelerometer of claim 23 wherein said beam is trimmable in a manner which affects the dynamic response of said plate.

* * * * *